Apr. 10, 1923.

H. D. CHURCH 1,451,648

INTERNAL COMBUSTION ENGINE

Filed June 5, 1920

Inventor:
Harold D. Church

Apr. 10, 1923.　　　　　　　　　　　　　　　　1,451,648
H. D. CHURCH
INTERNAL COMBUSTION ENGINE
Filed June 5, 1920　　　　3 sheets-sheet 3

Inventor:
Harold D. Church.
by Emery, Booth, Janney & Varney Attys

Patented Apr. 10, 1923.

1,451,648

UNITED STATES PATENT OFFICE.

HAROLD D. CHURCH, OF FAIRFIELD, CONNECTICUT, ASSIGNOR TO THE LOCOMOBILE COMPANY, OF BRIDGEPORT, CONNECTICUT, A CORPORATION OF DELAWARE.

INTERNAL-COMBUSTION ENGINE.

Application filed June 5, 1920. Serial No. 386,676.

*To all whom it may concern:*

Be it known that I, HAROLD D. CHURCH, a citizen of the United States, and a resident of Fairfield, county of Fairfield, and State of Connecticut, have invented an Improvement in Internal Combustion Engines, of which the following description, in connection with the accompanying drawings, is a specification, like characters on the drawings representing like parts.

This invention relates to internal combustion engines, being more particularly concerned with the valve-in-the-head type, and aims to improve the valve mechanism and to render the latter as silent as possible. My invention will be best understood by reference to the following description when taken in connection with the accompanying drawings of one specific embodiment thereof, while its scope will be more particularly pointed out in the appended claims.

Figure 2:
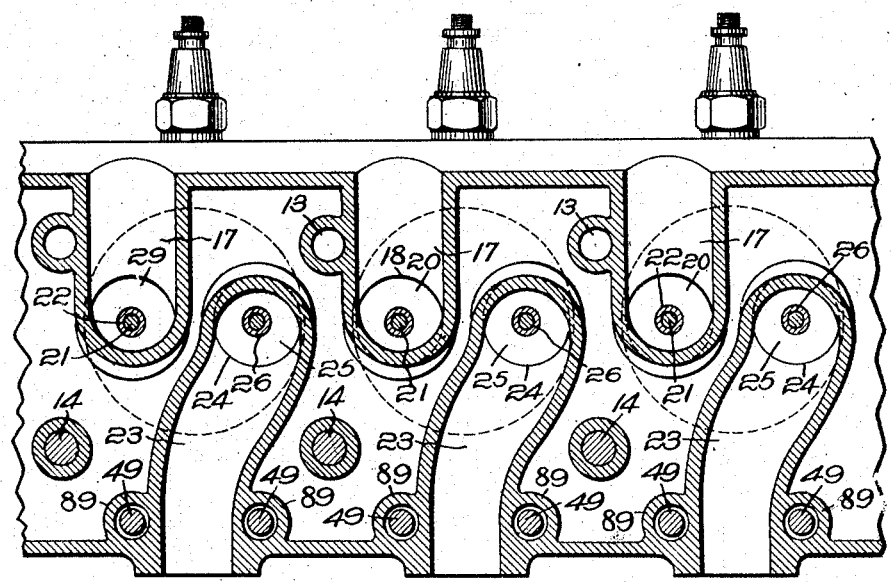
Fig. 2 is a horizontal sectional view on line 2—2 of Fig. 1.
Figure 3:
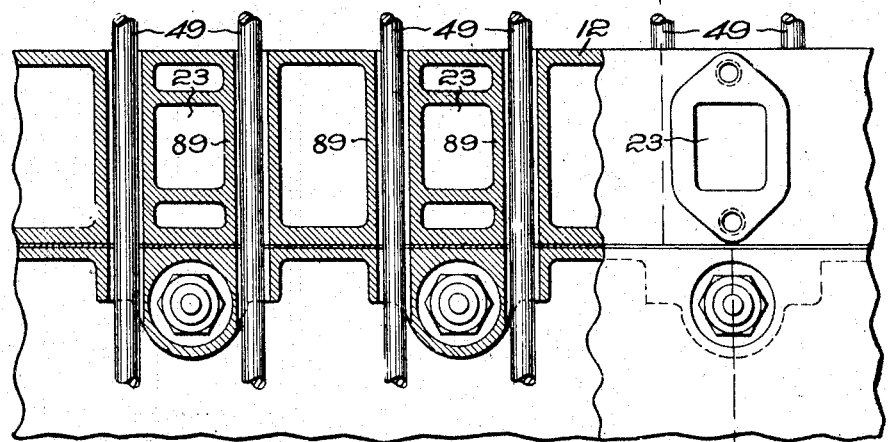
Fig. 3 is a vertical sectional view on line 4—4 of Fig. 1.

Referring to the drawings and to the embodiment of my invention which I have selected for exemplification, I have shown an internal combustion engine having a cylinder 5 supported on a suitable base, herein a crank case 6 which houses a crank shaft 7, the latter being provided with a crank pin 8 connected by a connecting rod 9, a wrist pin 10 and a piston 11 working in the cylinder. The engine may have any suitable number of cylinders but in the present example I have shown in Fig. 2 the inlet and exhaust ports for only two.

Figure 1:
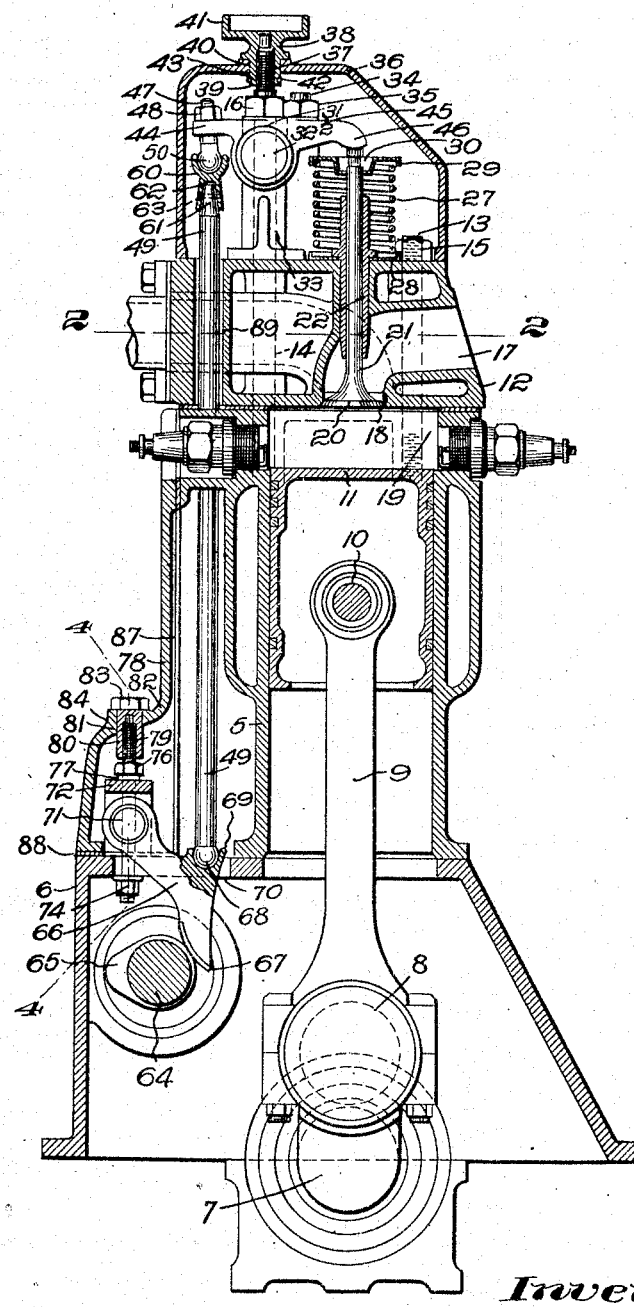
Fig. 1 is a vertical cross-sectional view on line 1—1 of Fig. 3, showing an internal combustion engine exemplifying my invention.

The cylinder is provided with a cylinder head 12, which in the present embodiment is separable therefrom and is secured thereto by studs 13 and 14 provided respectively with nuts 15 and 16 (see upper portion of Fig. 1). The cylinder head is provided with an inlet passage 17 terminating in a port 18 leading to a combustion chamber 19, and controlled by an inlet valve 20 of the puppet type provided with a stem 21 working in a guide 22. The cylinder head is further provided with an exhaust passage 23 (see Fig. 2) communicating by way of a port 24 with the combustion chamber 19, and controlled by a valve 25 provided with a stem 26 also mounted in a suitable guide identical with that of the inlet valve. In fact, the inlet and exhaust valves and their actuating mechanisms are identical, and hence it is deemed necessary to show and describe only the inlet valve mechanism.

Referring now to the inlet valve 20, the latter is provided with a usual closing spring 27 seated at its lower end against the cup-like spring seat 28, and at its upper end against a similarly shaped washer 29, the latter being secured to the valve stem 21 by a usual key 30. The spring closes the valve and holds the same closed in the usual manner until it is opened by the valve actuating mechanism now to be described.

The valve actuating mechanism comprises a rocking lever 31 fulcrumed on a pivot 32 supported by a bracket 33, which is preferably secured to the cylinder head 12 by the studs 14 and nuts 16, hereinbefore described, which assist in securing the cylinder head 12 to the cylinder 5. Additional studs 34 and nuts 35 may be provided to assist in securing the brackets 33 in place, these studs, however, terminating in the cylinder head. Preferably, the studs 14 also serve to hold in place on the cylinder head a cover 36 which houses the mechanism and excludes foreign matter therefrom, while at the same time tending to deaden the sound of the moving parts. The stud 14 is to this end provided with a reduced threaded stem 37, onto which is screwed a nut 38 having a sleeve 39 which turns in an opening 40 provided in the cover 36. Preferably the nut is provided with an enlarged handle portion 41 to facilitate rotation thereof without the use of a wrench. A spring collar 42 received in an annular groove 43 in the sleeve 39 prevents accidental detachment of the nut 38 from the cover 36. The latter may be removed from its place to expose the mechanism by simply rotating the nut 38 in the proper direction to unscrew it from the stem 37 of the stud 14.

The rocking lever 31 has a short arm 44 and a long arm 45, the latter herein being provided with a suitably rounded end 46 resting upon the upper end of the valve stem 21. The shorter arm in the present example carries a stud 4" passing through the arm and provided with a nut 48 by which it is secured thereto. This stud is suitably connected with a push rod 49 as by a ball and socket joint, herein comprising a ball 50 formed on the stud and received in a socket 60 appropriately secured to the push rod as by providing the latter with a tapered shank 61 received in a correspondingly shaped socket 62 and suitably held therein as by a pin 63.

The push rod extends lengthwise of the cylinder at one side of the latter and may be actuated by suitable means, herein a usual cam shaft 64 having a cam 65 cooperating in an appropriate manner with the push rod. In the present embodiment, an operative connection between the cam and push rod is furnished by a rocking lever 66 which presents a wiper 67 cooperating with the edge of the cam. Suitable pivotal connection with the push rod is made, as by a ball and socket joint herein comprising a ball 68 formed on the lower end of the push rod and received in a socket 69 formed on the lever. It should of course, be understood that in practice the cam shaft will be driven by and in suitably timed relation with the crank shaft 7 in any usual manner.

Figure 4:
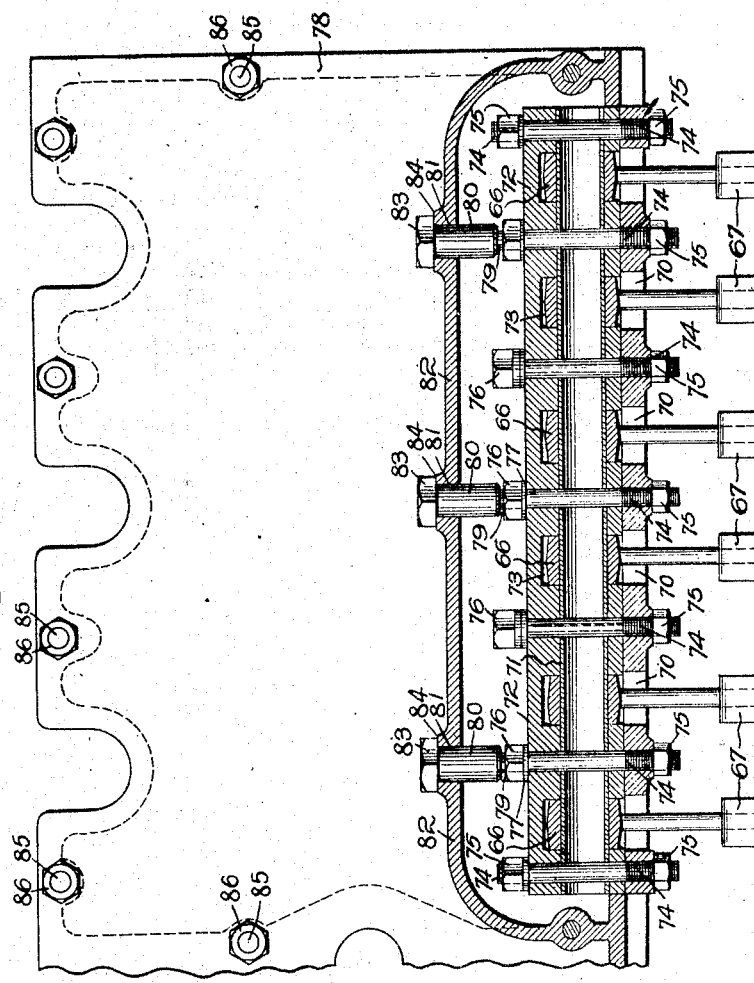
Fig. 4 is a vertical sectional view on line 4—4 of Fig. 1.

The upper portion of the lever 66 extends through an aperture 70 provided in the upper part of the crank case 6, on which the lever is suitably mounted as by the provision of a fulcrum comprising a pivot 71 carried by an appropriate support 72, which in the present example is in the form of a yoke or comb-like structure common to a plurality of the levers 66, as shown in Fig. 4, it being provided with a series of recesses or notches 73 in which the levers are received. The support herein is secured to the crank case by a series of studs 74 having their lower ends suitably secured to the crank case as by nuts 75. These studs extend in an upward direction through the support 72 and are provided thereabove with nuts 76 and lock washers 77 by means of which the supports are detachably secured in place. By first removing the push rods and then removing these nuts the supports 72 and lever 76 may be withdrawn in an upward direction.

Preferably some of the studs 74 also serve to assist in holding in place a cover plate 78 which houses the push rods and levers, protects them from the entrance of foreign matter, provides an enclosure for the oil mist from the crankcase, and deadens the sound of the working parts. Each of the studs to this end is provided with a threaded extension 79 on which is threaded a sleeve-like nut 80, the latter extending through an opening 81 provided in a laterally offset portion 82 on the cover plate. Exteriorly of the latter, the nut is provided with a head 83 which rests upon a boss or shoulder 84 on the cover plate. It should be observed that the stud 79 terminates within the chamber formed by the cover plate, hence when the sleevelike nuts 80 are unscrewed and withdrawn in an upward direction from the opening 81, the studs present no obstruction to the removal of the cover plate in a horizontal outward direction, yet the arrangement is such that the studs and nuts normally cooperate to force the cover plate in a downward direction toward the crank case. The cover plate is forced in an inward direction against the cylinder 5 by suitable means, herein a plurality of horizontal studs 85 threaded into the cylinder casting and provided with nuts 86. To insure a tight joint between the cover plate and cylinder casting on the one hand, and between the cover plate and the crank case on the other hand, I preferably provide a gasket having a vertical portion 87 and a horizontal portion 88, that is to say the gasket is right-angled or L-shaped.

In the use of engines of the valve-in-the-head type, difficulty is had in securing quiet action of the valve mechanism, this being due largely to the fact that the expansion of the cylinder is greater than that of the push rods, the result being that lost motion develops in the connections, such as between the valve stem and upper rocking lever, between the latter and the push rod and between the push rod and the part which is actuated by the cam. The present invention aims to silence the valve mechanism by making suitable compensation for the tendency of the cylinder to elongate more than the push rods. This is accomplished, first, by making the push rods of a material having a relatively high coefficient of expansion, such as aluminum or aluminum alloy; second, by bringing the exhaust gases in close proximity with the push rods as by directing the exhaust against sleeves which encircle the rods; third by multiplying the effect of the expansion of the rods by making the fulcra of the upper rocking levers nearer to the push rods than to the valve stems; and fourth, by avoiding multiplication of cam errors by the valve rockers, this being accomplished by the use of corresponding rocking levers cooperating with the cams, the ratio of the leverage in the upper rocker finding a corresponding ratio in the lower one. The first and second features are entirely novel so far as I am aware, the third in itself is not new, and the fourth is also entirely novel but forms the subject matter for another application.

The first feature, as already stated, resides in the use of aluminum or other material having a relatively high coefficient of expansion as compared with the cylinder. Since the coefficient of expansion of aluminum is, roughly, twice that of cast iron of which cylinders are usually made, the use of aluminum push rods is a material factor in the elimination of lost motion due to expansion.

The second feature, as already intimated, contemplates bringing the hot exhaust gases into close proximity with the push rods. In the present embodiment this is accomplished by surrounding each push rod with a sleeve 89 conveniently formed as a part of the cylinder head casting, and by carrying the exhaust passages 23 so close to these sleeves as to raise them and the enclosed push rods to a sufficiently high temperature to cause the push rods to elongate an amount substantially equal to the degree of elongation of the cylinders. This minimizes or entirely prevents the development of lost motion in the connections between the cams and the valve stems, a result which has long been sought but has heretofore been considered impossible of attainment.

Having thus described one embodiment of my invention but without limiting myself thereto, what I claim and desire by Letters Patent to secure is:

1. In an internal combustion engine, the combination of a cylinder having inlet and exhaust ports in its head, puppet valves controlling said ports, respectively, and having stems extending in the same general direction as the axis of said cylinder, and valve-actuating mechanism including rocking levers, one for each valve, and means for utilizing the engine's exhaust automatically to cause the maintenance of a substantially constant predetermined relation between said levers and their respective stems despite longitudinal expansion and contraction of said cylinder.

2. In an internal combustion engine, the combination of a cylinder having a port in its head, a puppet valve controlling said port and having a stem extending in the same general direction as the axis of said cylinder, and valve-actuating mechanism including a rocking lever, and a push-rod extending lengthwise of said cylinder and operating said lever and having a relatively high coefficient of expansion as compared with said cylinder.

3. In an internal combustion engine, the combination of a cylinder having inlet and exhaust ports in its head, puppet valves controlling said ports, respectively, and having stems extending in the same general direction as the axis of said cylinder, and valve-actuating mechanism including rocking levers, one for each valve, push-rods extending lengthwise of said cylinder and operating said levers, respectively, and means for utilizing hot exhaust gas automatically to maintain a substantially predetermined relation between said push-rods and their respective levers and between said levers and their respective valve stems.

4. In an internal combustion engine, the combination of a cylinder having a port in its head, a puppet valve controlling said port and having a stem extending in the same general direction as the axis of said cylinder, and valve-actuating mechanism including a rocking lever, a push-rod extending lengthwise of said cylinder and operating said lever and having a relatively high coefficient of expansion as compared with said cylinder, and means for directing hot exhaust gas into proximity with said push-rod.

5. In an internal combustion engine, the combination of a cylinder having inlet and exhaust ports in its head, puppet valves controlling said ports, respectively, and having stems extending in the same general direction as the axis of said cylinder, and valve-actuating mechanism including rocking levers, one for each valve, push-rods extending lengthwise of said cylinder and operating said levers, respectively, and means for directing hot exhaust gas into proximity with said push-rods.

6. In an internal combustion engine, the combination of a cylinder having inlet and exhaust ports in its head, puppet valves controlling said ports, respectively, and having stems extending in the same general direction as the axis of said cylinder, and valve-actuating mechanism including rocking levers, one for each valve, push-rods extending lengthwise of said cylinder and operating said levers, respectively, sleeves encircling said push-rods, respectively, and means for directing hot exhaust gas against said sleeves.

7. In an internal combustion engine of the overhead valve type in which puppet valves are operated by rockers and push-rods generally parallel with the cylinder, the combination with a valve and its rocker, of compensating means responsive to changes of temperature to maintain a substantially definite operative relation between the rocker and valve by causing a longitudinal expansion and contraction of said push-rods corresponding to the longitudinal expansion and contraction of said cylinder.

In testimony whereof, I have signed my name to this specification.

HAROLD D. CHURCH.